US012658519B2

(12) United States Patent
Fang et al.

(10) Patent No.: US 12,658,519 B2
(45) Date of Patent: Jun. 16, 2026

(54) BATTERY AND ELECTRIC APPARATUS

(71) Applicant: CONTEMPORARY AMPEREX TECHNOLOGY (HONG KONG) LIMITED, Hong Kong (CN)

(72) Inventors: Shaojie Fang, Ningde (CN); Min Mei, Ningde (CN); Jian Gao, Ningde (CN); Feng Jia, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 53 days.

(21) Appl. No.: 19/004,675

(22) Filed: Dec. 30, 2024

(65) Prior Publication Data

US 2025/0219231 A1     Jul. 3, 2025

(30) Foreign Application Priority Data

Jan. 2, 2024     (CN) .......................... 202420003290.4

(51) Int. Cl.
*H01M 50/264* (2021.01)
*H01M 50/249* (2021.01)

(52) U.S. Cl.
CPC ....... *H01M 50/264* (2021.01); *H01M 50/249* (2021.01)

(58) Field of Classification Search
CPC ............. H01M 50/264; H01M 50/249; H01M 50/262; B60K 1/04; Y02E 60/01
See application file for complete search history.

(56) References Cited

U.S. PATENT DOCUMENTS

| | | | |
|---|---|---|---|
| 2022/0190414 A1 | 6/2022 | An | |
| 2023/0182557 A1 | 6/2023 | Lim | |
| 2023/0238634 A1* | 7/2023 | Shin | .................... H01M 50/262 |
| | | | 429/100 |

FOREIGN PATENT DOCUMENTS

| | | |
|---|---|---|
| WO | 2020088443 A1 | 5/2020 |
| WO | 2023045462 A1 | 3/2023 |

OTHER PUBLICATIONS

Extended European Search Report from EP patent application No. 24223282.5, mailed May 15, 2025.
Intention to grant a patent dated Oct. 10, 2025 for application EP 24 223 282.5.

* cited by examiner

*Primary Examiner* — Matthew T Martin
*Assistant Examiner* — Bartholomew A Hornsby
(74) *Attorney, Agent, or Firm* — Ladas & Parry LLP

(57) ABSTRACT

A battery and an electric apparatus are disclosed. The battery includes a box and a bushing, where the box is provided with a mounting beam, that includes a first beam that is provided with a first mounting hole, and a second beam that is provided with a second mounting hole, the bushing includes a flange portion, a rod portion, and a connecting portion, the flange portion and the connecting portion are respectively connected to two ends of the rod portion, the flange portion protrudes from the rod portion, the rod portion passes through the first mounting hole, the connecting portion passes through the second mounting hole. the flange portion is sealably connected to the first beam and/or the rod portion is sealably connected to a wall of the first mounting hole, and the connecting portion is sealably connected to a wall of the second mounting hole.

12 Claims, 6 Drawing Sheets

1000

100

300

200

BATTERY AND ELECTRIC APPARATUS

CROSS REFERENCE TO RELATED APPLICATIONS

This application claims priority from Chinese patent application 202420003290.4 filed on Jan. 2, 2024, the subject matter of which is incorporated herein by reference in its entirety.

TECHNICAL FIELD

This application relates to the field of batteries, and specifically relates to a battery and an electric apparatus.

BACKGROUND

In related art, the frame of the battery box is locked and attached to the vehicle through bushings and bolts. However, due to tolerance issues between the bushings and the frame of the battery box, the bushing and the frame of the battery box cannot be sealed due to gaps therebetween, which easily leads to a condition that the bolts are insufficiently tightened and attached.

SUMMARY

In view of the foregoing problems, this application provides a battery and an electric apparatus, which can ensure the sealing between the bushing and the first beam and second beam connected.

According to a first aspect, this application provides a battery, where the battery includes a box and a bushing, where the box is provided with a mounting beam, the mounting beam includes a first beam and a second beam, the first beam is provided with a first mounting hole, the second beam is provided with a second mounting hole, the bushing includes a flange portion, a rod portion, and a connecting portion, along an axial direction of the rod portion, the flange portion and the connecting portion are respectively connected to two ends of the rod portion, the flange portion protrudes from the rod portion along a radial direction of the rod portion, the rod portion passes through the first mounting hole, the connecting portion passes through the second mounting hole, the flange portion is sealably connected to the first beam and/or the rod portion is sealably connected to a wall of the first mounting hole, and the connecting portion is sealably connected to a wall of the second mounting hole.

In the technical solution of the embodiments of this application, the flange portion and/or the rod portion is sealably connected to the first beam, and the connecting portion is sealably connected to the second beam, which may eliminate the assembly tolerances between the bushing and the first beam and between the bushing and the second beam, so as to achieve a sealed connection between the bushing and the first beam and second beam.

In some embodiments, the battery further includes a first sealing member, where the flange portion includes a first surface facing away from the rod portion and a second surface facing the rod portion, and the first sealing member seals the second surface and the first beam.

The first sealing member sealably connects the second surface and the first beam, which can enhance the sealing connection effect between the flange portion and the first beam.

In some embodiments, the second surface and/or the first beam is provided with a first accommodating groove surrounding the rod portion, and the first accommodating groove accommodates the first sealing member, so that the first sealing member sealably connects the flange portion and the first beam.

The first sealing member may be filled in the first accommodating groove, which can prevent the first sealing member from shifting and enhance the sealing connection effect between the flange portion and the first beam.

In some embodiments, the rod portion is rivetably connected to the wall of the first mounting hole.

This can provide good connection effect between the rod portion and the first beam, and enhance the connection strength between the bushing and the first beam.

In some embodiments, the rod portion includes a first end and a second end, where the first end is connected to the flange portion, the second end is connected to the connecting portion, and a first riveting structure is provided on a side surface of the first end along a circumferential direction of the bushing and/or the wall of the first mounting hole, so that the rod portion is rivetably connected to the wall of the first mounting hole.

The first riveting structure is formed into an annular shape along the circumferential direction of the bushing and/or the wall of the first mounting hole. The first riveting structure may be riveted to the wall of the first mounting hole along the circumferential direction of the bushing, so that the rod portion is tightly connected to the wall of the first mounting hole, and the rod portion is rigidly connected to the first beam, so as to avoid shaking between the first beam and the rod portion, which in turn affects the connection effect between the bushing and the first beam.

In some embodiments, the battery further includes a second sealing member, where the second sealing member seals the rod portion and the wall of the first mounting hole.

The second sealing member sealably connects the rod portion and the wall of the first mounting hole, which improves the sealing connection effect between the rod portion and the first beam.

In some embodiments, an annular second accommodating groove is provided on the rod portion and/or the wall of the first mounting hole, where the second accommodating groove accommodates the second sealing member so that the second sealing member sealably connects the rod portion and the wall of the first mounting hole.

The second sealing member is accommodated in the second accommodating groove, which can prevent the second sealing member from shifting and improve the sealing connection effect between the rod portion and the first beam.

In some embodiments, the battery further includes a third sealing member, where the third sealing member seals the connecting portion and a wall of the second mounting hole.

The third sealing member sealably connects the connecting portion and the wall of the second mounting hole, which improves the sealing connection effect between the connecting portion and the second beam.

In some embodiments, a third accommodating groove is provided on a side surface of the connecting portion along the circumferential direction of the bushing and/or the wall of the second mounting hole, the connecting portion passes through the second mounting hole, and the third accommodating groove accommodates the third sealing member so that the third sealing member sealably connects the connecting portion and the wall of the second mounting hole.

The third sealing member may be filled in the third accommodating groove, which prevents the third sealing member from shifting and improves the sealing effect between the connecting portion and the second beam.

In some embodiments, along the axial direction of the rod portion, an end surface of the connecting portion facing away from the rod portion does not protrude from the second mounting hole.

The end surface of the connecting portion facing away from the rod portion does not protrude from the second mounting hole, so that the head of a fastener may abut against the second beam instead of the connecting portion, thereby allowing the fastener to securely lock and attach the second beam and the first beam to a connection object.

In some embodiments, the connecting portion is a second riveting structure, and the second riveting structure is configured to be rivetably connected to the wall of the second mounting hole of the second beam.

The second riveting structure may be riveted to the second mounting hole along the circumferential direction of the bushing, so that the connecting portion is rigidly connected to the second beam, so as to avoid shaking between the second beam and the connecting portion, which in turn affects the connection effect between the bushing and the second beam.

According to a second aspect, this application provides an electric apparatus, including the battery according to any one of the foregoing embodiments, where the battery is configured to supply electric energy.

The foregoing description is merely an overview of the technical solution of this application. For a better understanding of the technical means in this application so that they can be implemented according to the content of the specification, and to make the above and other objectives, features, and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same components are denoted by same reference signs. In the accompanying drawings.

Figure 1:
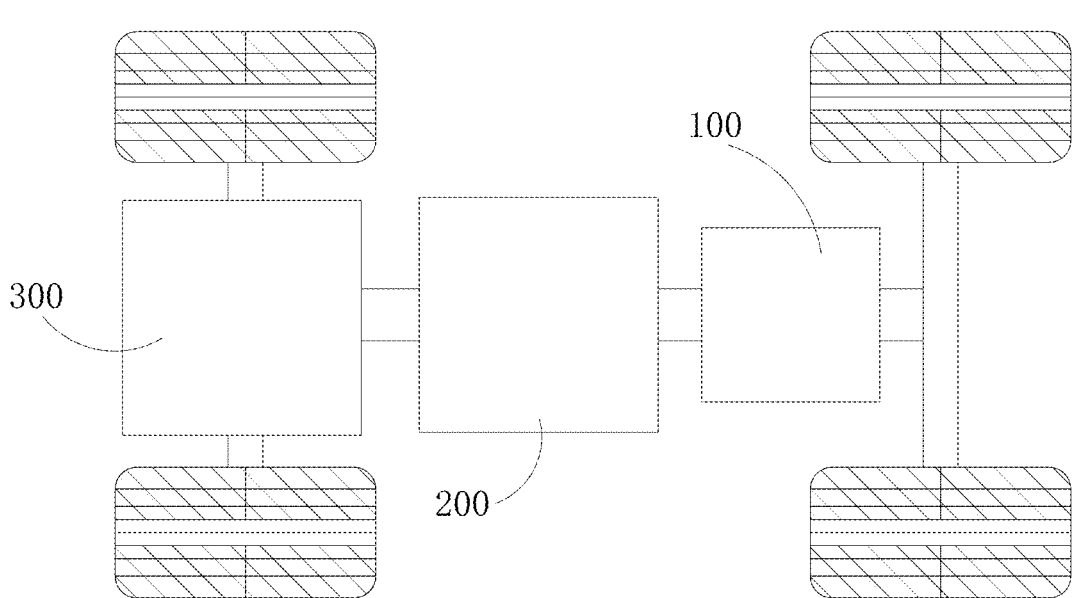
FIG. 1 is a schematic structural diagram of a vehicle according to some embodiments of this application.

Reference signs in specific embodiments are as follows:

vehicle 1000;

battery 100; controller 200; motor 300;

box 10; first portion 11; second portion 12;

battery cell 20;

bushing 30; flange portion 31; rod portion 32; connecting portion 33; through hole 34; first surface 310; second surface 311; first accommodating groove 312; first sealing member 313; first end 320; second end 321; first riveting structure 322; second accommodating groove 323; second sealing member 324; third accommodating groove 330; third sealing member 331;

mounting beam 40;

first beam 400; first mounting hole 401;

second beam 500; and second mounting hole 501.

DETAILED DESCRIPTION

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include/comprise" and "have" and any other variations thereof in the specification, claims, and brief description of drawings of this application are intended to cover non-exclusive inclusions.

In the description of the embodiments of this application, the technical terms "first", "second" and the like are merely intended to distinguish between different objects, and shall not be understood as any indication or implication of relative importance or any implicit indication of the number, specific sequence, or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in this specification does not necessarily refer to the same embodiment or an independent or alternative embodiment that is exclusive of other embodiments. Persons skilled in the art explicitly and implicitly understand that the embodiments described herein may be combined with other embodiments.

In the descriptions of the embodiments of this application, the term "and/or" is only an associative relationship for describing associated objects, indicating that three relationships may be present. For example, A and/or B may indicate the following three cases: presence of only A, presence of both A and B, and presence of only B. In addition, a character "/" in this specification generally indicates an "or" relationship between contextually associated objects.

In the descriptions of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitation on the embodiments of this application.

In the description of the embodiments of this application, unless otherwise specified and defined explicitly, the technical terms "mounting", "connection", "joining", and "fastening" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in this application as appropriate to specific situations.

Currently, from a perspective of the market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for traction batteries are also increasing.

The inventors of this application noticed that during installation of the battery, the lower end surface of the bushing and the lower plate of the side beam have a certain gap due to tolerance between the lower box frame bushing and the lower box side beam, which makes the interface unsealed and easily causes the bolts to be insufficiently tightened.

Based on the foregoing considerations, to solve the problem of the gap between the bushing and the beam, the inventors of this application conducted in-depth research and designed a battery. The battery includes a box and a bushing, where the box is provided with a mounting beam, the mounting beam includes a first beam and a second beam, the first beam is provided with a first mounting hole, the second beam is provided with a second mounting hole, the bushing includes a flange portion, a rod portion, and a connecting portion, along an axial direction of the rod portion, the flange portion and the connecting portion are respectively connected to two ends of the rod portion, the flange portion protrudes from the rod portion along a radial direction of the rod portion, the rod portion passes through the first mounting hole, the connecting portion passes through the second mounting hole, the flange portion is sealably connected to the first beam and/or the rod portion is sealably connected to a wall of the first mounting hole, and the connecting portion is sealably connected to a wall of the second mounting hole.

In such a battery, the flange portion and/or the rod portion is sealably connected to the first beam, and the connecting portion is sealably connected to the second beam, which may eliminate the assembly tolerances between the bushing and the first beam and between the bushing and second beam, so as to achieve a sealed connection between the bushing and the first beam and second beam.

The bushing disclosed in the embodiments of this application may be applied to, including but not limited to, batteries. The batteries may be applied to electric apparatuses as power sources or various energy storage systems using batteries as energy storage components. The electric apparatus may be but is not limited to a mobile phone, a tablet computer, a laptop computer, an electric toy, an electric tool, an electric bicycle, an electric vehicle, a ship, and a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, an electric apparatus according to an embodiment of this application being a vehicle 1000 is used as an example for description of the following embodiments.

Refer to FIG. 1. FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be arranged at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
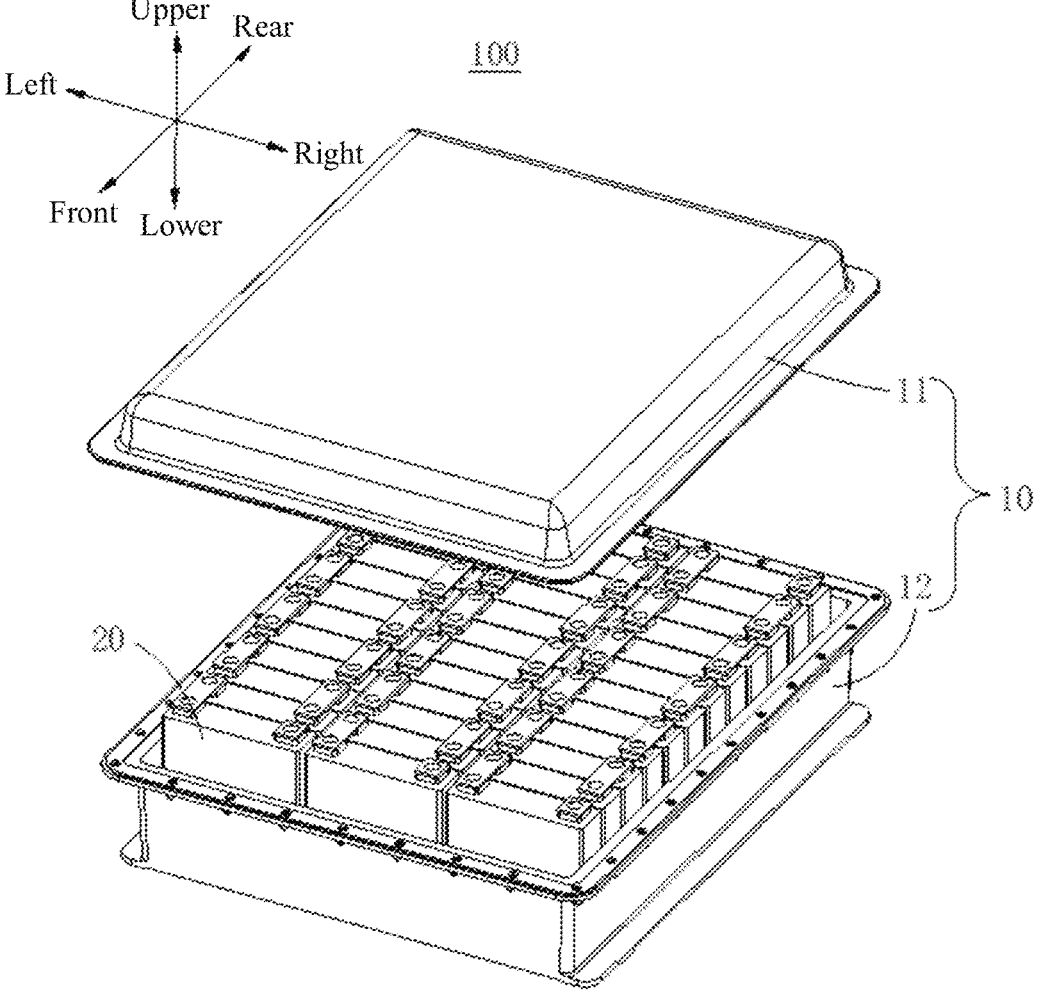
FIG. 2 is a schematic structural exploded view of a battery according to some embodiments of this application.

Refer to FIG. 2. FIG. 2 is an exploded view of a battery 100 according to some embodiments of this application. The battery 100 includes a box 10 and a battery cell 20, where the battery cell 20 is accommodated in the box 10. The box 10 is configured to provide an accommodating space for the battery cell 20. The box 10 may be a variety of structures. In some embodiments, the box 10 may include a first portion 11 and a second portion 12. The first portion 11 and the second portion 12 are engaged with each other so that the first portion 11 and the second portion 12 jointly define an accommodating space for accommodating the battery cell 20.

The second portion 12 may be a hollow structure with an opening at one end, the first portion 11 may be a plate structure, and the first portion 11 is engaged with the opening side of the second portion 12, so that the first portion 11 and the second portion 12 jointly define the accommodating space; or the first portion 11 and the second portion 12 may both be hollow structures with an opening on one side, and the opening side of the first portion 11 is engaged with the opening side of the second portion 12. Certainly, the box 10 formed by the first portion 11 and the second portion 12 may be in various shapes, for example, cylinder or cuboid.

In the battery 100, the battery cell 20 may be provided in plurality, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10. Certainly, the battery 100 may alternatively be formed in a manner that a plurality of battery cells 20 are connected in series, parallel, or series-parallel first to form a battery module and then a plurality of battery modules are connected in series, parallel, or series-parallel to form an entirety which is accommodated in the box 10. The battery 100 may further include other structures. For example, the battery 100 may further include a busbar configured to implement electrical connection between the plurality of battery cells 20.

Each battery cell 20 may be a secondary battery or a primary battery, or may be a lithium-sulfur battery, a sodium-ion battery, or a magnesium-ion battery, without being limited thereto. The battery cell 20 may be cylindrical, flat, cuboid, or of other shapes.

According to some embodiments of this application, referring to FIGS. 4 to 7 together, this application provides a battery 100, where the battery 100 includes a box 10 and a bushing 30. The box 10 is provided with a mounting beam 40. The mounting beam 40 includes a first beam 400 and a second beam 500. The first beam 400 is provided with a first mounting hole 401. The second beam 500 is provided with a second mounting hole 501. The bushing 30 includes a flange portion 31, a rod portion 32, and a connecting portion 33. Along an axial direction of the rod portion 32, the flange portion 31 and the connecting portion 33 are respectively connected to two ends of the rod portion 32. The flange portion 31 protrudes from the rod portion 32 along the radial direction of the rod portion 32. The rod portion 32 passes through the first mounting hole 401. The connecting portion 33 passes through the second mounting hole 504. The flange portion 31 is sealably connected to the first beam 400 and/or the rod portion 32 is sealably connected to a wall of the first mounting hole 401. The connecting portion 33 is sealably connected to a wall of the second mounting hole 504.

Optionally, the first beam 400 and the second beam 500 may both be plate-shaped. The first beam 400 is provided with a first mounting hole 401. The second beam 500 is provided with a second mounting hole 501. The first mounting hole 401 is aligned with the second mounting hole 501. During installation of the bushing 30, the bushing 30 may be inserted into the first beam 400 through the first mounting hole 401 in a direction from the first beam 400 to the second beam 500, and then into the second beam 500 through the second mounting hole 501. The flange portion 31 and/or the rod portion 32 may be sealably connected to the first beam 400, and the connecting portion 33 may be sealably connected to the second beam 500.

The bushing 30 is provided with a through hole 34. A fastener (for example, bolt) may be inserted into the through hole 34 in a direction from the second beam 500 to the first beam 400. The fastener may pass through the bushing 30 from an upper surface of the flange portion 31 and then be connected to the connection object, so that the first beam 400 and the second beam 500 are installed onto a connection object.

In an embodiment, the connection object may be the chassis of the vehicle 1000. The first beam 400 and the second beam 500 may be two side beams of the second portion 12 or the first portion 11 of the box 10. The two side beams are sealably connected by the bushing 30, which can avoid the problem that the bushing 30 and the two side beams cannot be sealed due to gaps caused by tolerance, ensuring that the fastener can securely lock the box 10 to the vehicle 1000.

This application does not specifically limit the material of the bushing 30. Optionally, the bushing 30 may be made of a metal material such as aluminum or stainless steel.

This application does not specifically limit the shape of the bushing 30. Optionally, the flange portion 31, the rod portion 32, and the connecting portion 33 may all be generally cylindrical. A diameter of the flange portion 31 is greater than a diameter of the rod portion 32, and the diameter of the rod portion 32 is greater than a diameter of the connecting portion 33.

Optionally, a shape of the first mounting hole 401 matches a shape of the rod portion 32, and the shape of the second mounting hole 501 matches a shape of the connecting portion 33. For example, the first mounting hole 401 is a cylindrical hole, and the rod portion 32 is cylindrical; and the second mounting hole 501 is a cylindrical hole, and the connecting portion 33 is cylindrical.

In an embodiment of this application, the flange portion 31 may be sealably connected to the first beam 400, the rod portion 32 may be sealably connected to the first beam 400, and the connecting portion 33 may be sealably connected to the second beam 500.

In an embodiment of this application, the flange portion 31 may be sealably connected to the first beam 400, and the connecting portion 33 may be sealably connected to the second beam 500.

Figure 3:
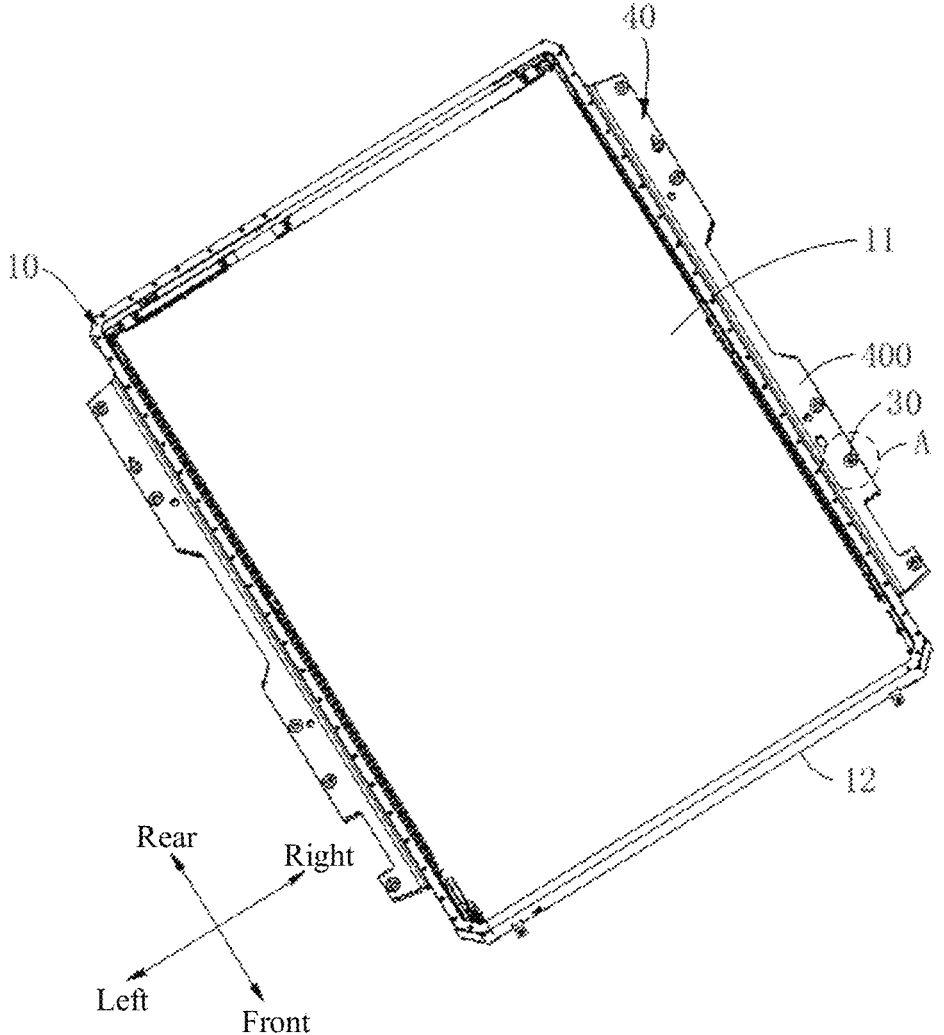
FIG. 3 is a schematic structural exploded view of a battery according to some embodiments of this application.
Figure 4:
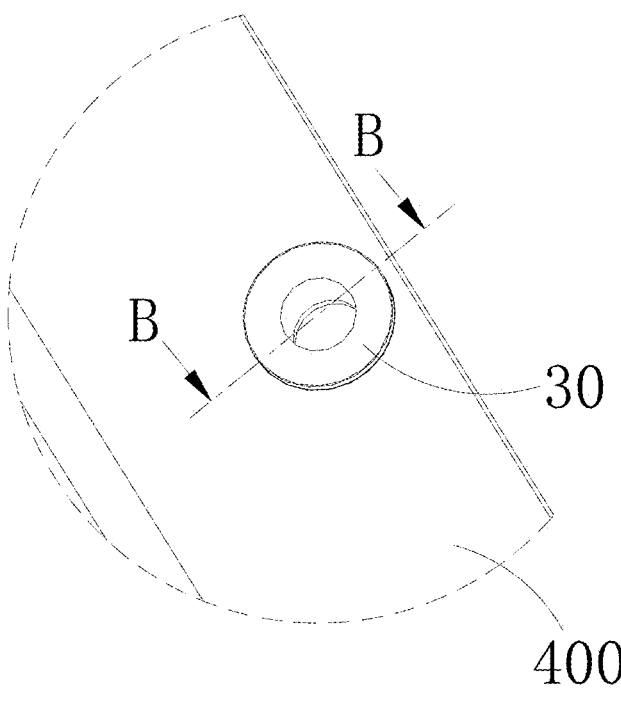
FIG. 4 is a schematic enlarged view of part A in FIG. 3.

In FIG. 3, the box 10 includes a first portion 11 and a second portion 12. The first portion 11 may serve as an upper box, and the second portion 12 may serve as a lower box. The first beam 400 and the second beam 500 may be provided on the same side and/or different sides of the lower box, or may be provided on the same side and/or different sides of the upper box. Refer to FIG. 3. The first beam 400 and the second beam 500 may be provided on the left side of the lower box, or may be provided on the right side of the lower box, or the first beam 400 and the second beam 500 may be provided on the left side of the lower box, or may be provided on the right side of the lower box. This application does not specifically limit thereto.

Figure 6:
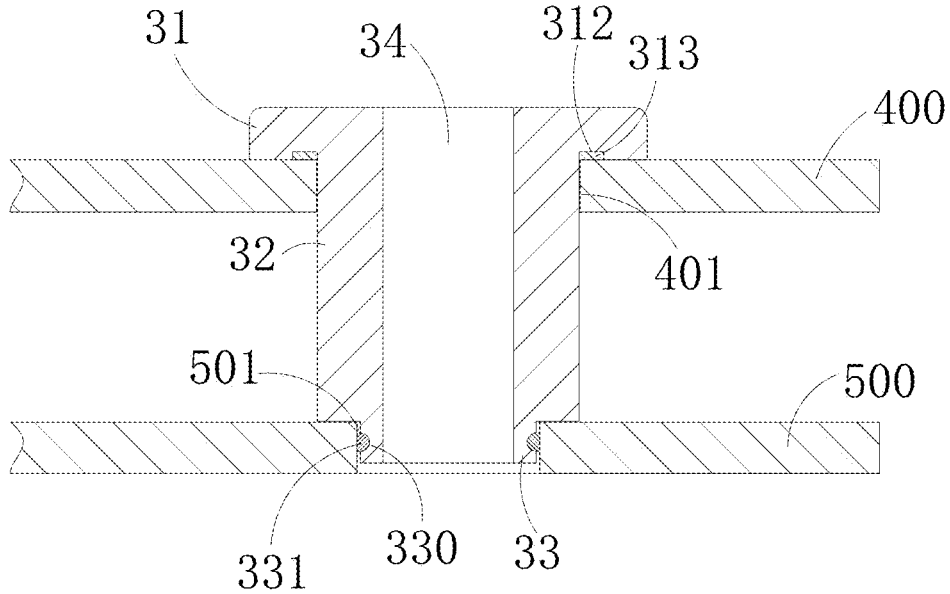
FIG. 6 is a schematic cross-sectional view of the battery along line B-B in FIG. 4.
Figure 7:
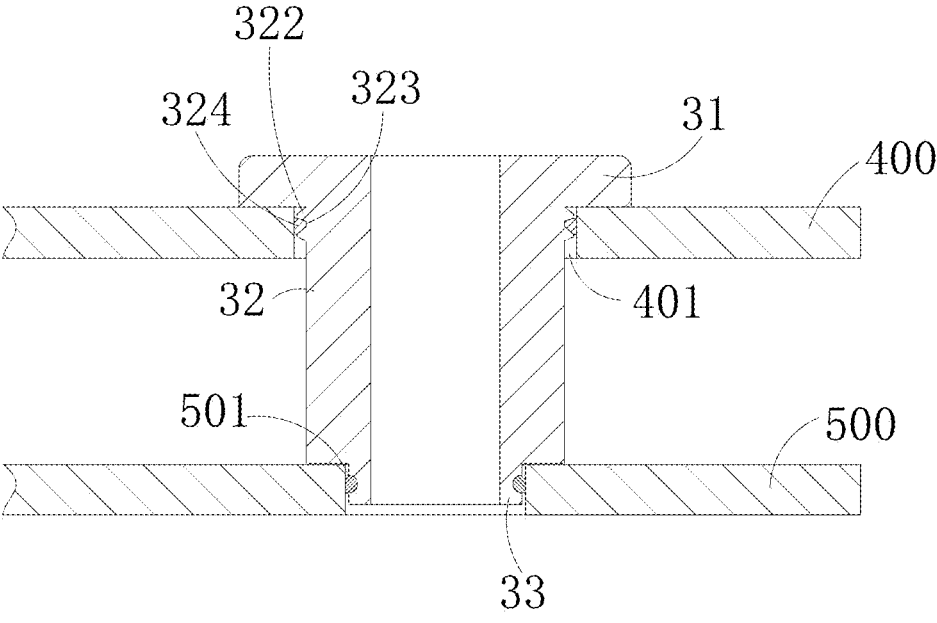
FIG. 7 is another schematic cross-sectional view of the battery along line B-B in FIG. 4.

Refer to FIGS. 6 and 7. The first beam 400 may be located above the second beam 500. During installation of the bushing 30, the bushing 30 may be installed from top to bottom, with the connecting portion 33 facing the first beam 400, and the bushing 30 is inserted downward into the first mounting hole 401 and the second mounting hole 501, so that the rod portion 32 passes through the first mounting hole 401 and the connecting portion 33 is located in the second mounting hole 501.

In an embodiment of this application, the rod portion 32 may be sealably connected to the first beam 400, and the connecting portion 33 may be sealably connected to the second beam 500.

According to some embodiments of this application, optionally, the battery 100 includes a first sealing member 313. The flange portion 31 includes a first surface 310 facing away from the rod portion 32 and a second surface 311 facing the rod portion 32. The first sealing member 313 seals the second surface 311 and the first beam 400.

Figure 5:
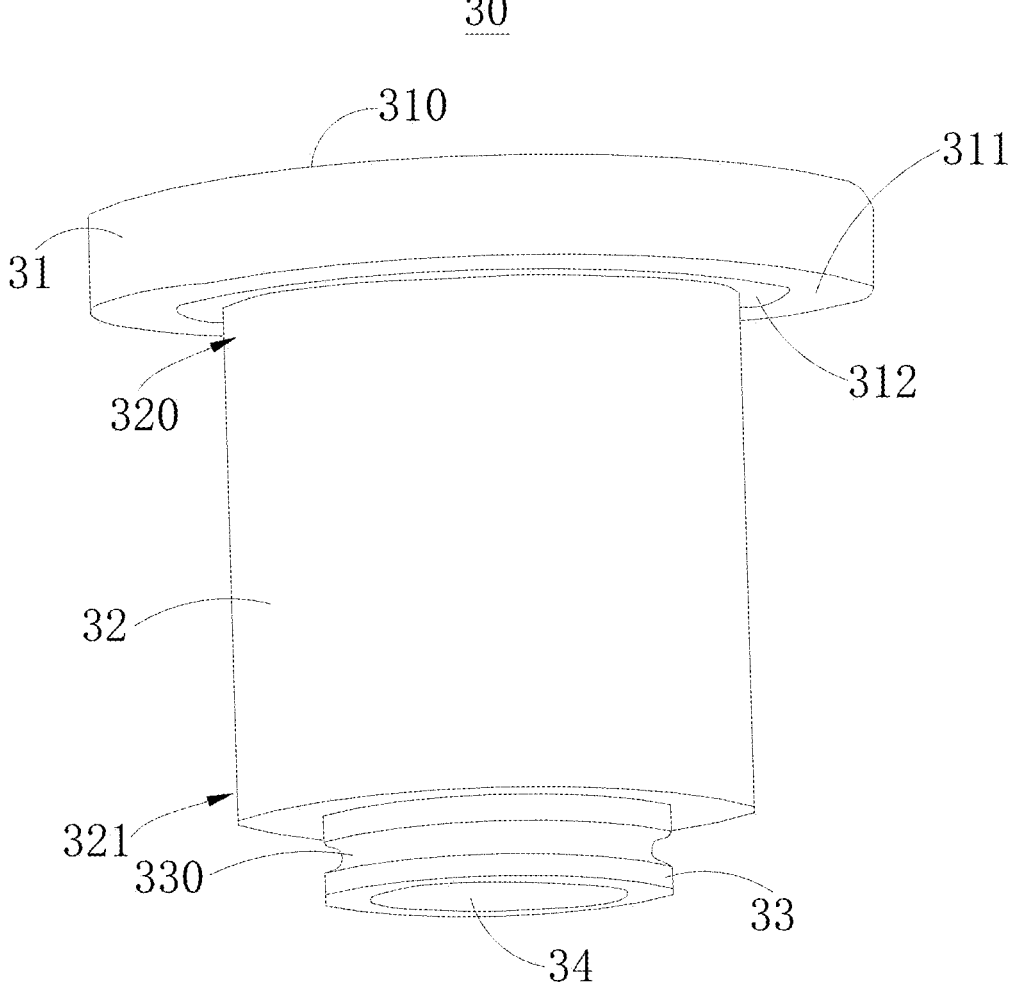
FIG. 5 is a schematic structural diagram of a bushing according to some embodiments of this application.

Specifically, in FIG. 5, the first surface 310 is an upper surface of the flange portion 31, and the second surface 311 is a lower surface of the flange portion 31.

The first sealing member 313 may be in a shape of ring surrounding the rod portion 32, and may sealably connect the flange portion 31 and the first beam 400 along a circumferential direction of the bushing 30, which improves the sealing connection effect between the flange portion 31 and the first beam 400.

Optionally, the first sealing member 313 may extend to an edge of the second surface 311 close to the rod portion 32, so that the first sealing member 313 may simultaneously sealably connect the flange portion 31, the rod portion 32, and the first beam 400. Optionally, the first sealing member 313 may be a sealant or a sealing ring.

According to some embodiments of this application, optionally, a first accommodating groove 312 surrounding the rod portion 32 is provided on the second surface 311 and/or the first beam 400. The first accommodating groove 312 accommodates the first sealing member 313 so that the first sealing member 313 sealably connects the flange portion 31 and the first beam 400.

Specifically, in FIG. 5, the first surface 310 is an upper surface of the flange portion 31, and the second surface 311 is a lower surface of the flange portion 31. The first accommodating groove 312 surrounding the rod portion 32 is provided on the second surface 311. It can be understood that in an embodiment, the first accommodating groove 312 surrounding the rod portion 32 is provided on the first beam 400. For example, the first accommodating groove 312 is provided on an upper surface of the first beam 400. In an embodiment, the first accommodating groove 312 surrounding the rod portion 32 is provided on the second surface 311 and the first beam 400. This application does not specifically limit thereto.

The first sealing member 313 may be filled in the first accommodating groove 312, which can prevent the first sealing member 313 from shifting. The first sealing member 313 and the first accommodating groove 312 are in a shape of ring surrounding the rod portion 32, and may sealably connect the flange portion 31 and the first beam 400 along the circumferential direction of the bushing 30, which improves the sealing connection effect between the flange portion 31 and the first beam 400.

Optionally, the first accommodating groove 312 may extend to an edge of the second surface 311 close to the rod portion 32, so that the first sealing member 313 may simultaneously sealably connect the flange portion 31, the rod portion 32, and the first beam 400.

Optionally, multiple first accommodating grooves 312 may be arranged on the flange portion 31 at intervals along a radial direction of the rod portion 32 so as to improve the sealing connection effect between the flange portion 31 and the first beam 400.

This application does not specifically limit the shape of the first accommodating groove 312. Optionally, a cross section of the first accommodating groove 312 is square.

According to some embodiments of this application, optionally, the rod portion 32 is rivetably connected to the wall of the first mounting hole 401.

Optionally, the entire portion of the rod portion 32 located within the first mounting hole 401 may be rivetably connected to the entire wall of the first mounting hole 401 along a thickness direction of the first beam 400. Optionally, part of the entire portion of the rod portion 32 located within the first mounting hole 401 may be rivetably connected to part of the wall of the first mounting hole 401 along a thickness direction of the first beam 400. This application does not specifically limit thereto.

This can provide good connection effect between the rod portion 32 and the first beam 400, and enhance the connection strength between the bushing 30 and the first beam 400.

According to some embodiments of this application, optionally, the rod portion 32 includes a first end 320 and a second end 321. The first end 320 is connected to the flange portion 31. The second end 321 is connected to the connecting portion 33. A first riveting structure 322 is provided on a side surface of the first end 320 along the circumferential direction of the bushing 30 and/or the wall of the first mounting hole 401, so that the rod portion 32 is rivetably connected to the wall of the first mounting hole 401.

In FIG. 5, the first end 320 of the rod portion 32 is a top end of the rod portion 32, and the second end 321 of the rod portion 32 is a bottom end of the rod portion 32. The flange portion 31 is connected to the top end of the rod portion 32, and the connecting portion 33 is connected to the bottom end of the rod portion 32. A first riveting structure 322 is provided on the side surface of the first end 320 along the circumferential direction of the bushing 30. In an embodiment, a first riveting structure 322 is provided on the wall of the first mounting hole 401. In an embodiment, a first riveting structure 322 is provided on a side surface of the first end 320 along the circumferential direction of the bushing 30 and the wall of the first mounting hole 401.

Optionally, the first riveting structure 322 is formed into a shape of ring along the circumferential direction of the bushing 30. The first riveting structure 322 may be riveted to the wall of the first mounting hole 401 along the circumferential direction of the bushing 30 for 360 degrees, so that the rod portion 32 is tightly connected to the wall of the first mounting hole 401, and the rod portion 32 is rigidly connected to the first beam 400, so as to avoid shaking between the first beam 400 and the rod portion 32, which in turn affects the connection effect between the bushing 30 and the first beam 400.

This application does not specifically limit the type of the first riveting structure 322. Optionally, the first riveting structure 322 is a press-riveting structure.

According to some embodiments of this application, optionally, the battery 100 includes a second sealing member 324. The second sealing member 324 seals the rod portion 32 and the wall of the first mounting hole 401.

Optionally, the second sealing member 324 is in a shape of ring surrounding the rod portion 32, and may sealably connect the first beam 400 and the rod portion 32 along the circumferential direction of the bushing 30, ensuring the sealing effect between the rod portion 32 and the first beam 400.

This application does not specifically limit the shape of the second sealing member 324. Optionally, a cross section of the second sealing member 324 is V-shaped. Optionally, the second sealing member 324 may be a sealant or a sealing ring.

Optionally, the second sealing member 324 may sealably connect the entire portion of the rod portion 32 located within the first mounting hole 401 and the entire wall of the first mounting hole 401 along the thickness direction of the first beam 400. Optionally, the second sealing member 324 may sealably connect part of the entire portion of the rod portion 32 located within the first mounting hole 401 and part of the wall of the first mounting hole 401 along the thickness direction of the first beam 400. This application does not specifically limit thereto.

The second sealing member 324 sealably connects the rod portion 32 and the wall of the first mounting hole 401, which improves the sealing connection effect between the rod portion 32 and the first beam 400.

According to some embodiments of this application, optionally, an annular second accommodating groove 323 is provided on the rod portion 32 and/or the wall of the first mounting hole 401. The second accommodating groove 323 accommodates the second sealing member 324 so that the second sealing member 324 sealably connects the rod portion 32 and the wall of the first mounting hole 401.

The second accommodating groove 323 may be formed in a shape of ring along the circumferential direction of the bushing 30 for 360 degrees. The second sealing member 324 is accommodated in the second accommodating groove 323, which can prevent the second sealing member 324 from shifting. The second sealing member 324 may sealably connect the rod portion 32 and the wall of the first mounting hole 401, which improves the sealing connection effect between the rod portion 32 and the first beam 400.

Optionally, multiple second accommodating grooves 323 may be arranged on the first riveting structure 322 at intervals along the axial direction of the rod portion 32 so as to improve the sealing connection effect between the rod portion 32 and the first beam 400.

The second sealing member 324 may be filled in the second accommodating groove 323. The second sealing member 324 and the second accommodating groove 323 each are in a shape of ring surrounding the rod portion 32, and may sealably connect the first beam 400 and the rod portion 32 along the circumferential direction of the bushing 30, which improves the sealing effect between the rod portion 32 and the first beam 400.

This application does not specifically limit the shape of the second accommodating groove 323. Optionally, a cross section of the second accommodating groove 323 is V-shaped.

According to some embodiments of this application, optionally, the battery 100 further includes a third sealing member 331. The third sealing member 331 seals the connecting portion 33 and the wall of the second mounting hole 501.

Specifically, the third sealing member 331 may be in a shape of ring along the circumferential direction of the bushing 30, and may sealably connect the second beam 500 and the connecting portion 33 along the circumferential direction of the bushing 30, which improves the sealing effect between the connecting portion 33 and the second beam 500.

This application does not specifically limit the shape of the third sealing member 331. Optionally, a cross section of the third sealing member 331 is semicircular. Optionally, the third sealing member 331 may be a sealant or a sealing ring.

Optionally, the third sealing member 331 may sealably connect the entire portion of the connecting portion 33 located within the second mounting hole 501 and the entire wall of the second mounting hole 501 along a thickness direction of the second beam 500. Optionally, the third sealing member 331 may sealably connect part of the entire portion of the connecting portion 33 located within the second mounting hole 501 and part of the wall of the second mounting hole 501 along the thickness direction of the second beam 500. This application does not specifically limit thereto.

The third sealing member 331 may sealably connect the connecting portion 33 and the wall of the second mounting hole 501, which improves the sealing connection effect between the connecting portion 33 and the second beam 500.

According to some embodiments of this application, optionally, a third accommodating groove 330 is provided on the side surface of the connecting portion 33 along the circumferential direction of the bushing 30 and/or the wall of the second mounting hole 504. The connecting portion 33 passes through the second mounting hole 501, and the third accommodating groove 330 accommodates the third sealing member 331 so that the third sealing member 331 sealably connects the connecting portion 33 and the wall of the second mounting hole 501.

In the embodiment of FIG. 5, a third accommodating groove 330 is provided on the side surface of the connecting portion 33 along the circumferential direction of the bushing 30. In an embodiment, a third accommodating groove 330 is provided on the wall of the second mounting hole 504. In an embodiment, a third accommodating groove 330 is provided on the side surface of the connecting portion 33 along the circumferential direction of the bushing 30 and the wall of the second mounting hole 504. This application does not specifically limit thereto.

During connecting the connecting portion 33 to the second beam 500, the connecting portion 33 may be inserted into the second mounting hole 501. The second accommodating groove 323 is provided on part of the side surface of the connecting portion 33 located within the second mounting hole 501, and the connecting portion 33 may be tightly connected to the wall of the second mounting hole 501.

Optionally, the third accommodating groove 330 may be formed in a shape of ring along the circumferential direction of the bushing 30 for 360 degrees. The third sealing member 331 is accommodated in the third accommodating groove 330, which can prevent the third sealing member 331 from shifting. The third sealing member 331 may sealably connect the connecting portion 33 and the wall of the second mounting hole 501, which improves the sealing connection effect between the connecting portion 33 and the second beam 500.

Optionally, multiple third accommodating grooves 330 may be arranged on the connecting portion 33 at intervals along the axial direction of the rod portion 32 so as to improve the sealing connection effect between the connecting portion 33 and the second beam 500.

The third sealing member 331 may be filled in the third accommodating groove 330, which prevents the third sealing member 331 from shifting. The third sealing member 331 and the third accommodating groove 330 each are in a shape of ring along the circumferential direction of the bushing 30, and may sealably connect the second beam 500 and the connecting portion 33 along the circumferential direction of the bushing 30, which improves the sealing effect between the connecting portion 33 and the second beam 500.

This application does not specifically limit the shape of the third accommodating groove 330. Optionally, a cross section of the third accommodating groove 330 is semicircular.

According to some embodiments of this application, optionally, along the axial direction of the rod portion 32, an end surface of the connecting portion 33 facing away from the rod portion 32 does not protrude from the second mounting hole 501.

In FIGS. 6 and 7, the end surface of the connecting portion 33 facing away from the rod portion 32 is a bottom end surface of the connecting portion 33. The bottom end surface of the connecting portion 33 does not protrude from the second mounting hole 501, meaning that the bottom end surface of the connecting portion 33 is flush with a bottom opening of the second mounting hole 501, or the bottom end surface of the connecting portion 33 is located within the second mounting hole 501.

In an embodiment, a fastener (for example, bolt) includes a connecting rod and a head. The head is connected to one end of the connecting rod, and the head protrudes from the connecting rod along a radial direction of the connecting rod. During locking the fastener the second beam 500 and the first beam 400 to a connection object, the connecting rod is inserted into the through hole 34 of the bushing 30 from the bottom end of the bushing 30 and passes through the top end of the bushing 30 to connect to the connection object.

The end surface of the connecting portion 33 facing away from the rod portion 32 does not protrude from the second mounting hole 501, so that the head of the fastener can abut against the second beam 500 instead of the connecting portion 33, thereby allowing the fastener to securely lock and attach the second beam 500 and the first beam 400 to the connection object.

According to some embodiments of this application, optionally, the connecting portion 33 is a second riveting structure, and the second riveting structure is configured to be riveted to the wall of the second mounting hole 501 of the second beam 500.

In FIGS. 6 and 7, the connecting portion 33 is connected to the bottom end of the rod portion 32, and the connecting portion 33 is located within the second mounting hole 501. The second riveting structure may be riveted to the second mounting hole 501 along the circumferential direction of the bushing 30, so that the connecting portion 33 is rigidly connected to the second beam 500, so as to avoid shaking between the second beam 500 and the connecting portion 33, which in turn affects the connection effect between the bushing 30 and the second beam 500.

This application does not specifically limit the type of the second riveting structure. Optionally, the second riveting structure is a press-riveting structure. It can be understood that in other embodiments, the connecting portion 33 may alternatively be interference-fitted with the second mounting hole 501.

In some embodiments of this application, optionally, the third accommodating groove 330 is provided on a side surface of the second riveting structure along the circumferential direction of the bushing 30. With the second riveting structure and the third sealing member 331 in the third accommodating groove 330, the connecting portion 33 can be rigidly and sealably connected to the second beam 500.

In an embodiment, the flange portion 31 may be sealably connected to the first beam through the first sealing member 313, the rod portion 32 may be sealably connected to the wall of the first mounting hole 401 through the second sealing member 324, and the connecting portion 33 may be sealably connected to the wall of the second mounting hole 501 through the third sealing member 331. The rod portion 32 may be rigidly connected to the first beam through the first riveting structure 322, and the connecting portion 33 may be rigidly connected to the second beam through the second riveting structure.

According to some embodiments of this application, this application further provides an electric apparatus including the battery 100 according to any one of the foregoing solutions, and the battery 100 is configured to supply electric energy to the electric apparatus.

The electric apparatus may be any one of the foregoing devices or systems using a battery.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A battery, comprising a box and a bushing, wherein the box is provided with a mounting beam, the mounting beam comprises a first beam and a second beam, the first beam is provided with a first mounting hole, the second beam is provided with a second mounting hole, the bushing comprises a flange portion, a rod portion, and a connecting portion, along an axial direction of the rod portion, the flange portion and the connecting portion are respectively connected to two ends of the rod portion, the flange portion protrudes from the rod portion along a radial direction of the rod portion, the rod portion passes through the first mounting hole, the connecting portion passes through the second mounting hole, the flange portion is sealably connected to the first beam and/or the rod portion is sealably connected to a wall of the first mounting hole, and the connecting portion is sealably connected to a wall of the second mounting hole.

2. The battery according to claim 1, wherein the battery further comprises a first sealing member, wherein the flange portion comprises a first surface facing away from the rod portion and a second surface facing the rod portion, and the first sealing member seals the second surface and the first beam.

3. The battery according to claim 2, wherein the second surface and/or the first beam is provided with a first accommodating groove surrounding the rod portion, and the first accommodating groove accommodates the first sealing member, so that the first sealing member sealably connects the flange portion and the first beam.

4. The battery according to claim 1, wherein the rod portion is rivetably connected to the wall of the first mounting hole.

5. The battery according to claim 4, wherein the rod portion comprises a first end and a second end, wherein the first end is connected to the flange portion, the second end is connected to the connecting portion, and a first riveting structure is provided on a side surface of the first end along a circumferential direction of the bushing and/or the wall of the first mounting hole, so that the rod portion is rivetably connected to the wall of the first mounting hole.

6. The battery according to claim 1, wherein the battery further comprises a second sealing member, wherein the second sealing member seals the rod portion and the wall of the first mounting hole.

7. The battery according to claim 6, wherein an annular second accommodating groove is provided on the rod portion and/or the wall of the first mounting hole, wherein the second accommodating groove accommodates the second sealing member so that the second sealing member sealably connects the rod portion and the wall of the first mounting hole.

8. The battery according to claim 1, wherein the battery further comprises a third sealing member, wherein the third sealing member seals the connecting portion and a wall of the second mounting hole.

9. The battery according to claim 8, wherein a third accommodating groove is provided on a side surface of the connecting portion along the circumferential direction of the bushing and/or the wall of the second mounting hole, the connecting portion passes through the second mounting hole, and the third accommodating groove accommodates the third sealing member so that the third sealing member sealably connects the connecting portion and the wall of the second mounting hole.

10. The battery according to claim 1, wherein along the axial direction of the rod portion, an end surface of the connecting portion facing away from the rod portion does not protrude from the second mounting hole.

11. The battery according to claim 1, wherein the connecting portion is a second riveting structure, and the second riveting structure is rivetably connected to the wall of the second mounting hole.

12. An electric apparatus, comprising the battery according to claim 1, wherein the battery is configured to provide electric energy.

* * * * *